Sept. 14, 1965   D. N. ERLENBACH   3,205,723
MOTION CONVERTER MECHANISMS FOR ELECTRIC WINDSHIELD WIPERS
Filed Nov. 14, 1962
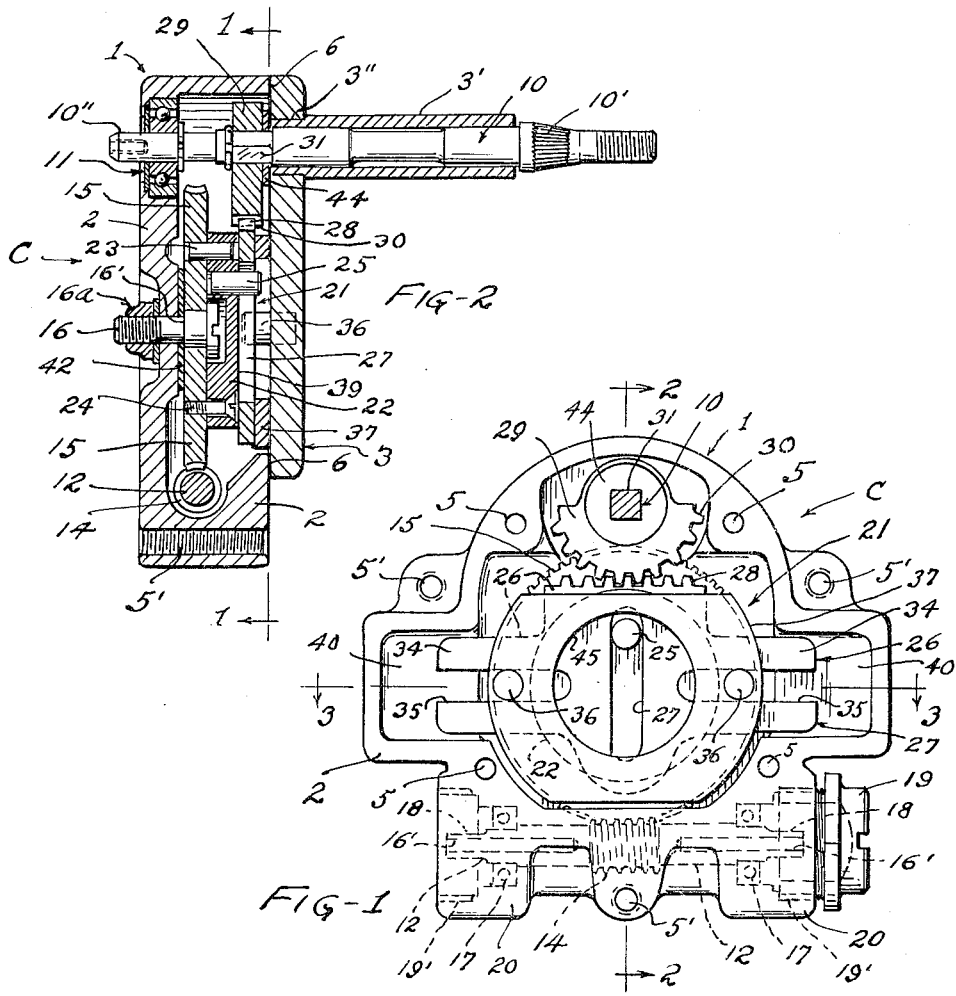
INVENTOR.
DAVID N. ERLENBACH
BY George M. Soule
ATTORNEY

United States Patent Office 3,205,723
Patented Sept. 14, 1965

3,205,723
MOTION CONVERTER MECHANISMS FOR
ELECTRIC WINDSHIELD WIPERS
David N. Erlenbach, Lakewood, Ohio, assignor to Curtiss-Wright Corporation, a Delaware corporation
Filed Nov. 14, 1962, Ser. No. 237,545
3 Claims. (Cl. 74—50)

The present invention relates to a motion converter mechanism or unit (hereinafter usually converter) especially adapted for electric-motor-driving of an oscillating windshield wiper for so called light airplanes the maximum speeds of which seldom exceed 300 m.p.h. In the class or type of aircraft windshield wiping duty just mentioned mass and size of the converters must be held within prescribed minimums, and manufacturing costs must be low as compared with those involved in so called heavy duty types of windshield wiper systems, as for high speed military aircraft and commercial carrier aircraft.

The converter hereof is adapted to be worm and worm gear driven from a suitable motor, e.g., via flexible shafting; the worm gear drives a crank pin entering a slot in and extending crosswise of the motion of a reciprocatably mounted plate, forming with the plate a scotch yoke; and rack teeth on the plate are in constant mesh with a pinion or sector on a wiper-connected rotary shaft constituting oscillating output of the converter. Components such as those just above mentioned are conventionally mounted in a suitable housing comprising low cost light weight metal castings such as aluminum, and suitable guideways for the rack member of the scotch yoke are formed by suitable machining operations in one or several parts constituting the housing. In such case the rack member or plate, usually steel, tends rapidly to wear away the guideway surfaces, reducing the efficiency of the converter through friction and wear, finally resulting in instability and inaccuracy of movement of the rack or plate thus reducing the useful life of the converter and wasting power. In the present converter the rotating, reciprocating and oscillating parts are made of sufficiently high grade and strong material (e.g. steel or hard bronze alloy) adequately to resist distortion and wear, yet are so constructed and related as to be relatively inexpensive and light in weight; the sliding contact areas thereof are minimized; said parts can be easily and quickly replaced when necessary, and the useful life of the light weight metal housing can be such as to outlast that of the average airplane served by the converter.

Objects and advantages of the present converter construction not indicated above will be brought out in the following description of a preferred form. The essential characteristics of the invention are summarized in the claims.

In the drawing:

FIG. 1 is a front elevation of the converter unit assembly with the front cover removed, or as indicated at 1—1 on FIG. 2.

FIG. 2 is a central sectional view taken approximately as indicated at 2—2 on FIG. 1.

FIG. 3 is a detail sectional view taken as at 3—3 on FIG. 1.

The converter assembly or unit C as herein shown (full scale incidentally) comprises a housing or casing 1 made up, as shown, of a light weight metal main hollow casting member 2 and a complementary cover member 3 of similar metal secured together as by screws or bolts, not shown, in registering openings located as at 5, FIG. 1, against a sealing gasket 6, FIGS. 2 and 3. The casting 2 has additional holes at 5' for attachment of the converter to suitable mounting brackets not shown.

The cover member 3 is mainly a flat aluminum casting including, preferably, a higher grade, tougher and stronger tubular bearing portion 3' (e.g. forged aluminum) force fitted into place in a bore 3" of the cover casting and forming a substantially leak-proof main bearing and support for an oscillating output shaft 10 of the converter C.

The output shaft 10 is adapted to carry and drive a wiper arm assembly (not shown) conventionally or suitably connected to the shaft 10 as at serrations 10'. Another, preferably anti-friction bearing or bearing assembly 11 for the shaft 10 is fitted into the main casting 2 as clearly shown in FIG. 2. The bearing assembly 11 is sealed outward along the shaft 10 which projects through the bearing at 10" to support an electric-switch-operating cam (not shown). The inner side of the bearing assembly 11 is exposed to receive lubricant thereinto from within the casing 1. The shaft 10 is held in place axially by snap-ring type fasteners as will be apparent from FIG. 2.

The input shaft 12, FIGS. 1 and 2, of the converter C is preferably made of hard, strong metal (e.g. hardened steel), and has a worm formation 14 thereon in constant mesh with a worm wheel 15 of bronze or similar metal carried by a stub shaft 16 shown as a screw shouldered at 16' and detachably secured as by a nut and washer assembly 16a to the casing member 2 as clearly shown in FIG. 2. The input shaft 12 (see FIG. 1) is carried by bearing assemblies 17 (similar to bearing 11) which can be of outwardly sealed construction (seals not shown). The ends of the shaft 12 project as at 18 beyond the bearings for detachable connection (e.g., via end sockets 16' in the shaft of polygonal transverse shape) with adapter end fitting assemblies of a conventional flexible drive shaft (not shown). Such shaft, in turn, is suitably connected with a driving motor (not shown). Whichever end portion 18 of the input shaft 12 is not to be connected to the motor is protected by a screw threaded cap 19 (e.g. plastic) occupying one of two identical internally threaded bore portions 19' in respective hollow boss portions 20 of casting member 2.

The scotch yoke mechanism, indicated 21, comprises as shown a drive crank portion of worm wheel 15 in the form of a rigid circular disc or plate 22, preferably steel, secured as by two dowel pins 23 and two screws 24 (one of each shown) to the worm wheel 15. The disc or plate 22 is recessed to receive and conceal the head of wheel-supporting screw 16. The dowel pins 23 are actually located diametrically of each other (shown otherwise for convenience only in FIG. 2 as are the screws 24); and the plate 22 has a hardened cylindrical crank pin 25 projecting therefrom as shown by comparison of FIGS. 1 and 2.

The crank pin 25 of drive plate 22 moves freely in a cross slot 27 (shown vertical) in a suitably heat treated or hardened flat preferably steel crosshead plate 26 guided for right line reciprocation as will be described later herein. The plate or crosshead 26 has rack teeth 28 along one of its edges in constant mesh with teeth 30 on a flat segmental pinion member 29 secured to turn with the output shaft 10 (e.g.) via a squared portion 31 of the shaft mating a complementary hole through the pinion.

As usual in mechanisms of the class shown the scotch yoke 21 imparts oscillatory harmonic motion to the output shaft 10.

The guides for the reciprocating flat plate or crosshead 26 of the scotch yoke 21 include identical arm portions 34 of the crosshead which are bifurcated to provide ways shown as axially aligned open mutually parallel slots 35 freely and slidably guiding the plate 26 as supported on two hardened mutually parallel cylindrical pins 36 projecting loosely through respective openings 38 (looseness not shown) in a high-wear-resisting basically cylindrical disc-like member 37 forming a wear plate for the crosshead as supported in face-to-face contact with the cover member 3. The wear plate 37 holds the scotch yoke plate 26 in light sliding contact with a flat smooth face 39 on the crank-forming disc member 22 already described.

Cavities 40, FIGS. 1 and 3, in the main casting member 2 are loosely occupied by the bifurcated or way-forming arm portions 34 of the scotch yoke plate or crosshead 26, so that no portions of the crosshead can ever touch the casting. The crosshead plate 26, in effect, floats between two flat lubricant films. Similarly the worm wheel 15 is prevented from making direct contact with the aluminum casting member 2 by provision of a flat hard smooth washer 42 (FIG. 2) lying against a boss portion of the casting member 2 around the stub shaft or screw 16. A similar hard washer 44, FIG. 2, lies between the pinion segment 29 and the cover casting 3.

The various surfaces of the parts just described above which are in flat sliding contact with each other as illustrated are smooth finished and receive adequate lubricant films from grease with which the inside of the housing 1 is suitably charged. The circular opening 45, FIG. 1, in the basically circular thrust and wear plate 37 assists in adequately maintaining the contact area between the plate 37 and the scotch yoke plate 26 at a relatively small amount. The various "flat" surfaces in heavy duty units can be further reduced to advantage by formation of grooves therein (not shown).

It is evident from the above in reference to the drawing that the working and supporting components of and for the present scotch yoke mechanisms 21 and all associated torque transmitting components can be very inexpensively manufactured and easily assembled and disassembled without requiring special or unusual tools.

If desired, as for heavy duty installations, the hard cylindrical pins 25 and 36 can be made, in effect, as rollers (not so shown); but such refinement is not required in the illustrated relatively light duty converter assembly (e.g., for light airplane windshield wiper service as earlier above outlined).

Control of the electric driving motor for the converter C hereof for variable speed operation and for wiper blade parking can be essentially as shown and described in a U.S. patent of C. R. Sacchini, 2,560,000 issued to the assignee hereof July 10, 1951. The earlier mentioned switch-operating cam (not shown) on output-shaft-projection 10", FIG. 2, cooperates with manual-switch-operated circuit means as in said patent for motor braking operation during parking.

I claim:
1. In a motion converter of the class described, a housing adapted to be formed of light weight metal, an oscillatory output shaft in the housing, a drive wheel in the housing having a crank pin projecting from one face thereof, a scotch yoke crosshead having a cross slot receiving the crank pin, bearing means between the crosshead and the housing supporting the crosshead out of contact with the housing metal and in operatively abutting contact with said face of the drive wheel, the crosshead having mutually opposed ways formed therein crosswise of said slot, parallel stiff projections carried rigidly by the housing and forming supports for the crosshead and engaging the ways thereof, and means operating to impart oscillatory motion to the output shaft as a function of reciprocating motion of the crosshead.

2. In a motion converter of the class described, a hollow housing formed by a plurality of complementary metal casting members, a drive or input wheel rotatably supported by one casting member and having a crank pin projecting parallel to the turning axis of the wheel, a generally flat scotch yoke crosshead having a slot therein receiving a crank pin, oscillatory output drive means having a rack and pinion type connection to the crosshead for operation thereby, a pair of pins projecting from a second casting member into the principal plane of the crosshead, oppositely extending, mutually parallel guideways on the crosshead transverse to said slot and receiving respective said pins for support of the crosshead in said plane, and a wear plate on the second casting member cooperating with the drive wheel to prevent displacement of the crosshead in directions transversely of said plane.

3. The mechanism according to claim 2 wherein said pair of pins project through respective openings in the wear plate for support of the wear plate in its principal plane.

References Cited by the Examiner
UNITED STATES PATENTS

| | | | |
|---|---|---|---|
| 1,861,698 | 6/32 | Horton | 74—78 X |
| 2,393,193 | 1/46 | Sacchini | 74—50 |
| 2,452,496 | 10/48 | Schneider et al. | 74—50 X |